(12) United States Patent
Mäki et al.

(10) Patent No.: US 12,665,814 B2
(45) Date of Patent: Jun. 23, 2026

(54) DETERMINING NETWORK TOPOLOGY

(71) Applicant: Teleste Networks Oy, Littoinen (FI)

(72) Inventors: Kari Mäki, Turku (FI); Sami Salo, Littoinen (FI)

(73) Assignee: Teleste Networks Oy, Littoinen (FI)

( * ) Notice: Subject to any disclaimer, the term of this patent is extended or adjusted under 35 U.S.C. 154(b) by 0 days.

(21) Appl. No.: 19/226,438

(22) Filed: Jun. 3, 2025

(65) Prior Publication Data

US 2025/0373500 A1 Dec. 4, 2025

(30) Foreign Application Priority Data

Jun. 4, 2024 (FI) ..................................... 20245717

(51) Int. Cl.
H04L 41/12 (2022.01)

(52) U.S. Cl.
CPC .................................... H04L 41/12 (2013.01)

(58) Field of Classification Search
CPC ......... H04N 21/6118; H04N 21/64723; H04N 21/6168; H04N 7/102; H04N 21/64784; H04L 21/2801; H04L 25/0204; H04L 41/22; H04L 41/12; H04H 20/78; H04B 1/12; H03F 1/3241; H03F 3/211; H03F 3/68

See application file for complete search history.

(56) References Cited

U.S. PATENT DOCUMENTS 10,601,671 B1 * 3/2020 Oren ........................ H04L 41/22
11,863,145 B1 * 1/2024 Celedon ............... H03G 3/3068

2006/0015921 A1 * 1/2006 Vaughan ............... H04M 7/006
725/127
2007/0076505 A1 * 4/2007 Radtke ................ H04J 14/0283
365/222
2013/0279914 A1 * 10/2013 Brooks ............. H04Q 11/0067
398/43

(Continued)

FOREIGN PATENT DOCUMENTS

WO WO 2019/141893 7/2019

OTHER PUBLICATIONS

Communication of Acceptance for Finnish Application No. 20245717 dated Oct. 31, 2024 (42 pages).

*Primary Examiner* — Mahran Y Abu Roumi
(74) *Attorney, Agent, or Firm* — Mueting Raasch Group

(57) ABSTRACT

A method for determining a topology of a cable television (CATV) network segment, wherein the segment comprises a network node and a plurality of amplifiers in one or more branches of the segment, the method comprising steps of a) providing a first amplifier with instructions to adjust downstream signal level; b) monitoring changes of signal level or parameters of gain/slope alignment elements in one or more amplifiers in said segment, said changes being caused as a compensation to the first amplifier adjusting its downstream signal level; c) storing information about each of said one or more amplifiers changing their signal level or said parameters as a compensation to the first amplifier adjusting its downstream signal level; repeating steps a-c for all subsequent amplifiers in the segment; and determining the topology of the segment based on the information of amplifiers locating in downstream direction in respect to each amplifier.

17 Claims, 5 Drawing Sheets

(56) References Cited

U.S. PATENT DOCUMENTS

| 2017/0237492 A1* | 8/2017 | Mutalik | H04B 10/25751 |
| | | | 398/72 |
| 2019/0028068 A1* | 1/2019 | Schemmann | H04L 25/0204 |
| 2020/0329282 A1* | 10/2020 | Mäki | H04B 1/12 |
| 2020/0374484 A1* | 11/2020 | Halen | H04N 21/6118 |
| 2021/0293580 A1* | 9/2021 | Dupre | G01D 5/145 |
| 2021/0293901 A1* | 9/2021 | Dupre | G01R 33/0082 |
| 2023/0109851 A1* | 4/2023 | Wells | H04N 21/43615 |
| | | | 725/78 |
| 2023/0199265 A1 | 6/2023 | Maki | |
| 2024/0214008 A1* | 6/2024 | Williams | H04B 1/0075 |

* cited by examiner

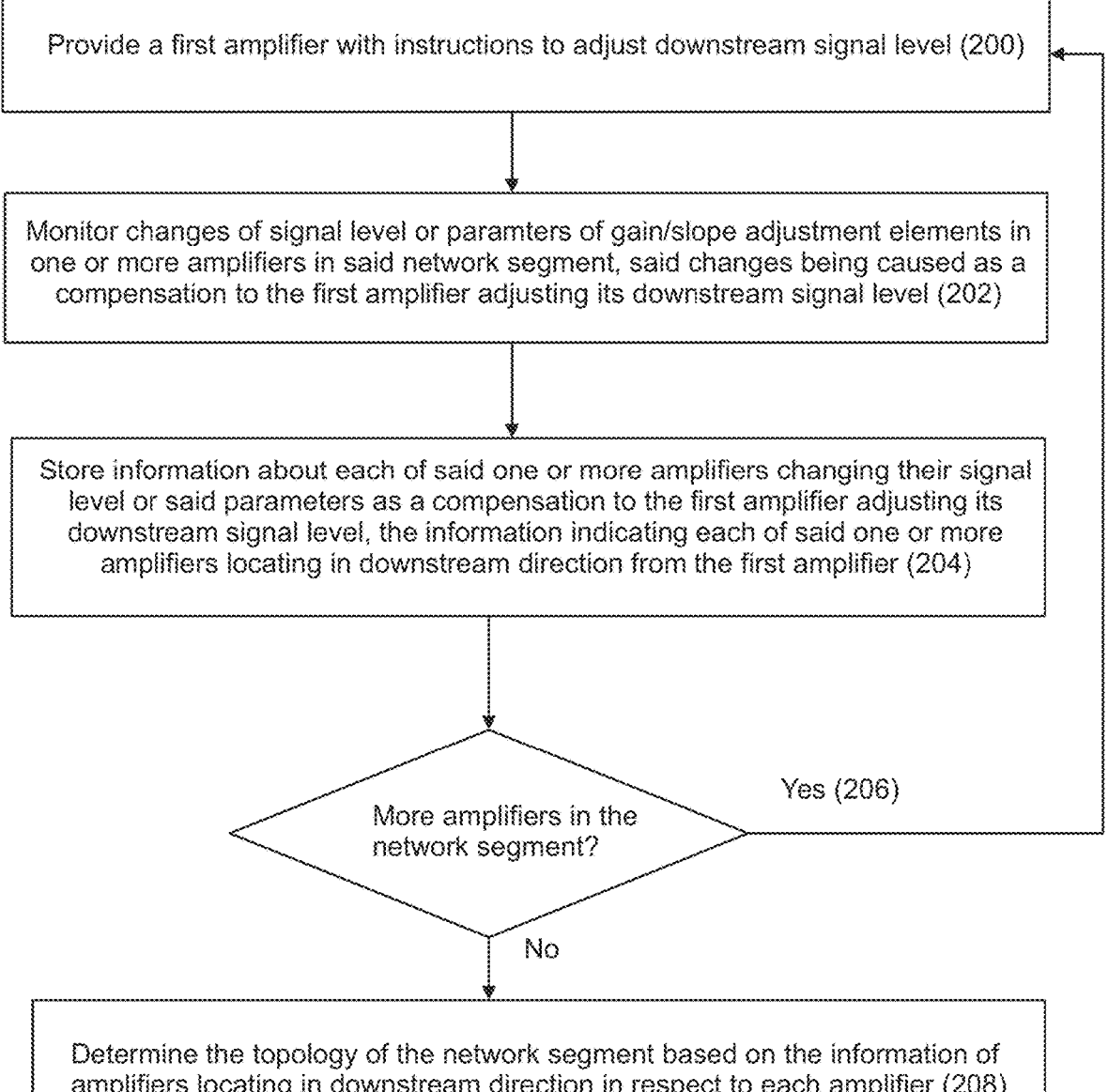

Provide a first amplifier with instructions to adjust downstream signal level (200)

Monitor changes of signal level or paramters of gain/slope adjustment elements in one or more amplifiers in said network segment, said changes being caused as a compensation to the first amplifier adjusting its downstream signal level (202)

Store information about each of said one or more amplifiers changing their signal level or said parameters as a compensation to the first amplifier adjusting its downstream signal level, the information indicating each of said one or more amplifiers locating in downstream direction from the first amplifier (204)

More amplifiers in the network segment?

Yes (206)

No

Determine the topology of the network segment based on the information of amplifiers locating in downstream direction in respect to each amplifier (208)

Fig. 2

DETERMINING NETWORK TOPOLOGY

RELATED PATENT DOCUMENTS

This application claims the benefit of priority under 35 U.S.C. § 119(a) to Finnish Application No. 20245717, filed 4 Jun. 2024, the disclosure of which is incorporated by reference herein in its entirety.

FIELD OF THE INVENTION

The invention relates to cable television (CATV) networks, and especially to determining topology of CATV networks.

BACKGROUND

CATV networks may be implemented with various techniques and network topologies, but currently most cable television networks are implemented as so-called HFC networks (Hybrid Fiber Coax), i.e. as combinations of a fibre network and a coaxial cable network. The terms CATV network, broadband data network and HFC network may be used interchangeably.

In an HFC network, a main amplifier (a.k.a. headend or CCAP) of the network is connected via an optical fibre network to one or more optical network units (ONU), which convert the optical signal to an electric signal to be relayed further in a coaxial cable network segment. The coaxial cable network segment comprises a plurality of broadband amplifiers for amplifying the downstream and upstream transmissions in the network segment. The connection(s) between the headend and the ONU(s) are implemented as star or point-to-point connections, whereas the broadband amplifiers are arranged in chain, tree and branch configuration.

Even though the CATV network operators would benefit from knowing the exact topology of their networks, the information about the topology of the coaxial cable network segments is typically not managed accurately enough: the documentation is typically carried out manually, whereupon it is prone to errors and easily outdated. While various methods exist for determining the network topology, they typically need further investments in the HFC network or cannot guarantee reliable determination of the network topology.

Therefore, an improved arrangement is needed for determining topology of CATV networks.

BRIEF SUMMARY

Now, an improved arrangement has been developed to reduce the above-mentioned problems. As aspects of the invention, we present a method, a computer program product implementing the method and an apparatus, which are characterized in what will be presented in the independent claims.

The dependent claims disclose advantageous embodiments of the invention.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the invention, there is provided a method for determining a topology of a cable television (CATV) network segment, wherein the network segment comprises a network node and a plurality of amplifiers in one or more branches of the network segment, the method comprising steps of a) providing a first amplifier with instructions to adjust downstream signal level;

b) monitoring changes of signal level or parameters of gain/slope alignment elements in one or more amplifiers in said network segment, said changes being caused as a compensation to the first amplifier adjusting its downstream signal level;

c) storing information about each of said one or more amplifiers changing their signal level or said parameters as a compensation to the first amplifier adjusting its downstream signal level, the information indicating each of said one or more amplifiers locating in downstream direction from the first amplifier; repeating steps a-c for all subsequent amplifiers in the network segment; and determining the topology of the network segment based on the information of amplifiers locating in downstream direction in respect to each amplifier.

According to an embodiment, the method comprises, after step c, steps of d) providing the first amplifier with instructions to adjust the downstream signal level to opposite direction;

e) monitoring changes of signal level or parameters of gain/slope alignment elements in one or more amplifiers in said network segment, said changes being caused as a compensation to the first amplifier adjusting its downstream signal level to the opposite direction;

f) storing information about each of said one or more amplifiers changing their signal level or said parameters as a compensation to the first amplifier adjusting its downstream signal level to the opposite direction; repeating steps d-f for all subsequent amplifiers in the network segment; and confirming the topology of the network segment based on the information of amplifiers changing their signal level as a compensation to any amplifier adjusting its downstream signal level to opposite direction.

According to an embodiment, said amplifiers are provided with a transponder for bi-directional communication between each amplifier and a remote control unit.

According to an embodiment, said gain/slope alignment elements of the amplifiers comprise at least one of an automatic level and slope control (ALSC) unit or an automatic gain control (AGC) unit, wherein said changes performed as a compensation to another amplifier adjusting its downstream signal level are carried out automatically by the ALSC unit or the AGC unit.

According to an embodiment, the downstream signal level is adjusted by a value larger than deadband of the ALSC unit or the AGC unit, such as +1-+2 dB.

According to an embodiment, the method comprises adjusting the slope of the downstream signal more predominantly at a low frequency part of a downstream signal band than at a high frequency part of a downstream signal band.

According to an embodiment, the network segment comprises one or more cable modems connected to each of the plurality of amplifiers, the method comprising steps of g) providing a first amplifier with instructions to adjust upstream signal level;

h) monitoring changes of upstream signal level in one or more cable modems in said network segment, said changes being caused as a compensation to the first amplifier adjusting its upstream signal level;

i) storing information about each of said one or more cable modems changing their upstream signal level as a compensation to the first amplifier adjusting its upstream signal level, the information indicating each of said one or more cable modems locating in downstream direction from the first amplifier;

repeating steps g-i for all subsequent amplifiers in the network segment; and determining the topology of the network segment based on the information of cable modems locating in downstream direction in respect to each amplifier.

According to an embodiment, the method comprises, after step i, steps of j) providing the first amplifier with instructions to adjust the upstream signal level to opposite direction;

k) monitoring changes of upstream signal level in one or more cable modems in said network segment, said changes being caused as a compensation to the first amplifier adjusting its upstream signal level to opposite direction;

l) storing information about each of said one or more cable modems changing their upstream signal level as a compensation to the first amplifier adjusting its upstream signal level to opposite direction;

repeating steps j-l for all subsequent amplifiers in the network segment; and confirming the topology of the network segment based on the information of cable modems changing their upstream signal level as a compensation to any amplifier adjusting its upstream signal level to opposite direction.

According to a second aspect, there is provided a computer program product, embodied on a non-transitory computer readable medium, the computer program product comprising instructions causing, when executed on at least one processor, at least one apparatus to perform the above method and/or one or more of the related embodiments.

An apparatus according to a third aspect comprises at least one processor and at least one memory, said at least one memory stored with computer program code thereon, the at least one memory and the computer program code configured to, with the at least one processor, cause the apparatus at least to perform:

a) provide, in a cable television (CATV) network segment comprising a network node and a plurality of amplifiers in one or more branches of the network segment a first amplifier with instructions to adjust downstream signal level;

b) monitor changes of signal level or parameters of gain/slope alignment elements in one or more amplifiers in said network segment, said changes being caused as a compensation to the first amplifier adjusting its downstream signal level;

c) store information about each of said one or more amplifiers changing their signal level or said parameters as a compensation to the first amplifier adjusting its downstream signal level, the information indicating each of said one or more amplifiers locating in downstream direction from the first amplifier; repeat steps a-c for all subsequent amplifiers in the network segment; and determine a topology of the network segment based on the information of amplifiers locating in downstream direction in respect to each amplifier.

According to an embodiment, the apparatus comprises computer program code configured to, with the at least one processor, cause the apparatus to d) provide the first amplifier with instructions to adjust the downstream signal level to opposite direction;

e) monitor changes of signal level or parameters of gain/slope alignment elements in one or more amplifiers in said network segment, said changes being caused as a compensation to the first amplifier adjusting its downstream signal level to opposite direction;

f) store information about each of said one or more amplifiers changing their signal level or said parameters as a compensation to the first amplifier adjusting its downstream signal level to the opposite direction;

repeat steps d-f for all subsequent amplifiers in the network segment; and confirm the topology of the network segment based on the information of amplifiers changing their signal level as a compensation to any amplifier adjusting its downstream signal level to opposite direction.

According to an embodiment, said amplifiers are provided with a transponder for bi-directional communication between each amplifier and a remote control unit.

According to an embodiment, said gain/slope alignment elements of the amplifiers comprise at least one of an automatic level and slope control (ALSC) unit or an automatic gain control (AGC) unit, wherein said changes performed as a compensation to another amplifier adjusting its downstream signal level are carried out automatically by the ALSC unit or the AGC unit.

According to an embodiment, the downstream signal level is adjusted by a value larger than deadband of the ALSC unit or the AGC unit, such as +1-+2 dB.

According to an embodiment, the apparatus comprises computer program code configured to, with the at least one processor, cause the apparatus to adjust the slope of the downstream signal more predominantly at a low frequency part of a downstream signal band than at a high frequency part of a downstream signal band.

According to an embodiment, the network segment comprises one or more cable modems connected to each of the plurality of amplifiers, the apparatus comprising computer program code configured to, with the at least one processor, cause the apparatus to g) provide a first amplifier with instructions to adjust upstream signal level;

h) monitor changes of upstream signal level in one or more cable modems in said network segment, said changes being caused as a compensation to the first amplifier adjusting its upstream signal level;

i) store information about each of said one or more cable modems changing their upstream signal level as a compensation to the first amplifier adjusting its upstream signal level, the information indicating each of said one or more cable modems locating in downstream direction from the first amplifier;

repeat steps g-i for all subsequent amplifiers in the network segment; and determine the topology of the network segment based on the information of cable modems locating in downstream direction in respect to each amplifier.

According to an embodiment, the apparatus comprises computer program code configured to, with the at least one processor, cause the apparatus to j) provide the first amplifier with instructions to adjust the upstream signal level to opposite direction;

k) monitor changes of upstream signal level in one or more cable modems in said network segment, said changes being caused as a compensation to the first amplifier adjusting its upstream signal level to opposite direction;

l) store information about each of said one or more cable modems changing their upstream signal level as a compensation to the first amplifier adjusting its upstream signal level to opposite direction;

repeat steps j-l for all subsequent amplifiers in the network segment; and confirm the topology of the network segment based on the information of cable modems changing their upstream signal level as a compensation to any amplifier adjusting its upstream signal level to opposite direction.

These and other aspects, embodiments and advantages will be presented later in the detailed description of the invention.

BRIEF DESCRIPTION OF THE DRAWINGS

The invention will now be described in more detail in connection with preferred embodiments with reference to the appended drawings, in which:

FIG. 2 shows a flow chart for determining the topology of a network segment according to an embodiment of the invention;

DETAILED DESCRIPTION OF THE EMBODIMENTS

Figure 1A:
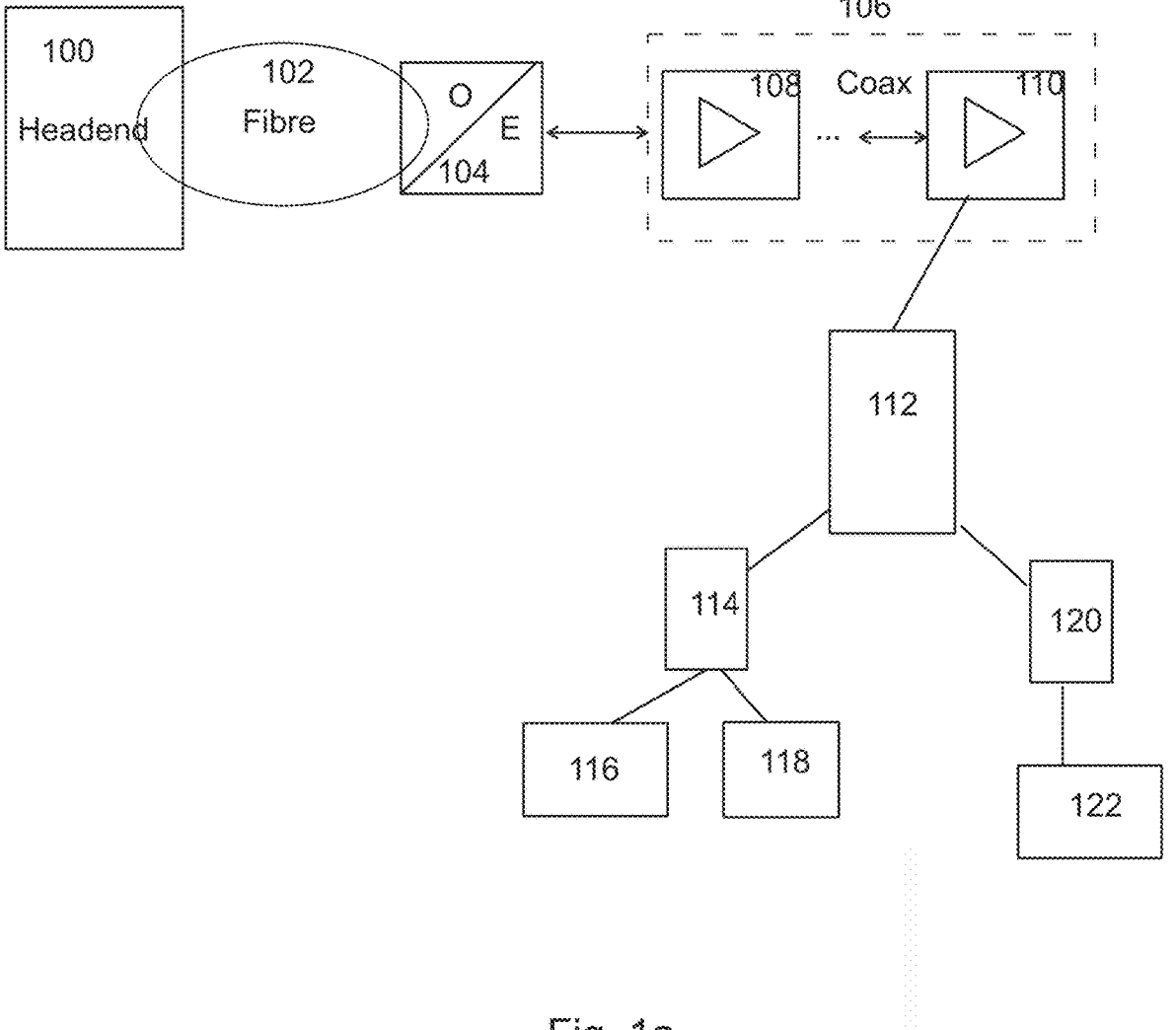
FIG. 1a shows the general structure of a typical HFC network.

FIG. 1 shows the general structure of a typical HFC network. Program services are introduced from the main amplifier 100 (a so-called headend or CCAP) of the network via an optical fibre network 102 to a fibre node 104, which converts the optical signal to an electric signal to be relayed further in a coaxial cable network 106. Such a node 104 can be an analogue node or a so-called RPD/RMD node. Depending on the length, branching, topology, etc. of the coaxial cable network, this coaxial cable segment typically comprises a plurality of broadband amplifiers 108, 110 for amplifying program service signals in a heavily attenuating coaxial media. From the amplifier the program service signals are introduced to a cable network 112 of a smaller area, such as a distribution network of an apartment building, which are typically implemented as coaxial tree or star networks comprising signal splitters for distributing the program service signals to each customer. The cable network 112, such as the distribution network of an apartment, may further comprise a Network Interface Unit (NIU) or Point of Entry (PoE) device arranged to divide signals to appropriate home appliances. The NIU may operate as a home amplifier. From a wall outlet the signal is further relayed either via a cable modem 114 to a television receiver 116 or a computer 118, or via a so-called set-top box 120 to a television receiver 122.

The HFC network may be implemented according to various standards. In Europe, video transmission in the HFC networks have traditionally been implemented according to DVB-C (Digital Video Broadcasting-Cable) standard, but currently there is an on-going shift to more widely use the DOCSIS (Data Over Cable Service Interface Specification) standard.

DOCSIS is a CATV standard providing specifications for high-bandwidth data transfer in an existing CATV system. DOCSIS may be employed to provide Internet access over existing hybrid fiber-coaxial (HFC) infrastructure of cable television operators. DOCSIS has been evolved through versions 1.0, 1.1, 2.0, 3.0 and 3.1 to the latest version of 4.0.

When implementing the HFC network of FIG. 1 according to DOCSIS, the headend 100 of the CATV network comprises inputs for signals, such as TV signals and IP signals, a television signal modulator and a cable modem termination system (CMTS). CMTS operation can be also implemented fully virtually by a SW located typically in a cloud. The CMTS provides high-speed data services to customers thorough cable modems (CM; 114) locating in homes. The CMTS forms the interface to the IP-based network over the Internet. It modulates the data from the Internet for downstream transmission to homes and receives the upstream data from homes. The CMTS additionally manages the load balancing, error correction parameters and the class of service (CoS).

Signals from the headend 100 are distributed optically (fiber network 102) to within the vicinity of individual homes, where the optical signals are converted to electrical signals at the terminating points 104. The electrical signals are then distributed to the various homes via the existing 75 ohm coaxial cables 106. The maximum data transfer of the coaxial cables is limited due to strong frequency-based attenuation. Therefore, the electrical signals transmitted over coaxial cables must be amplified. The amplifiers 108, 110 used for this purpose are suited to a specific frequency range. In addition, the upstream and downstream must occur over the same physical connection. The last part 112 of the coaxial connection between the CMTS and the CMs branches off in a star or a tree structure. A CMTS transmits the same data to all CMs located along the same section of cable (one-to-many communications). A request/grant mechanism exists between the CMTS and the CMs, meaning that a CM needing to transmit data must first send a request to the CMTS, after which it can transmit at the time assigned to it.

DOCSIS 3.1 provides the concept of Distributed CCAP Architecture (DCA). Converged Cable Access Platform (CCAP) may be defined as an access-side networking element or set of elements that combines the functionality of a CMTS with that of an Edge QAM (i.e. the modulation), providing high-density services to cable subscribers. Conventionally, the CCAP functionalities have been implemented in the headend/hub, such as the headend 100 in FIG. 1. In a DCA, some features of the CCAP are distributed from headend/hub to the network elements closer to the customers, for example to the fibre nodes 104 in FIG. 1. The CCAP functionalities left to be implemented in the headend/hub may be referred to as CCAP core.

DOCSIS 3.1 specifies at least two network element concepts, i.e. a Remote PHY Device (RPD) and a Remote-MACPHY Device (RMD), to which some functionalities of the headend can be distributed. A recent version of DOCSIS 3.1 specification also provided Annex F introducing a Full Duplex DOCSIS 3.1 technology, where a new distributed access node called Full Duplex (FDX) Node is determined. These network elements implementing at least part of the CCAP functionalities may be referred to as DCA nodes.

One issue relating to the introduction of DOCSIS 3.1 and 4.0 is the need to eventually adjust the frequency range and the bandwidth of the communication channels to meet the requirements of faster communication. The older DOCSIS standards up to the version 3.0 provide an upstream bandwidth of 5-42 MHZ (in Americas) or 5-65 MHZ (in Europe) and a downstream bandwidth of 85-862 MHz or even up to 1.0 GHz. DOCSIS 3.1 introduces a downstream band up to 1218 MHz. In DOCSIS 3.1, the upper frequency edge of the upstream bandwidth is raised to 204 MHZ, causing the lower frequency edge of the downstream bandwidth to be raised to 258 MHz. The development of DOCSIS in 3.x and 4.0 versions will require expanding the upper frequency edge of the RF signals to 1.8 GHZ, and eventually even over 3 GHZ. In the so-called 1.8 GHz products, the downstream bandwidth range will be either 108 or 258-1794 MHz.

Figure 1B:
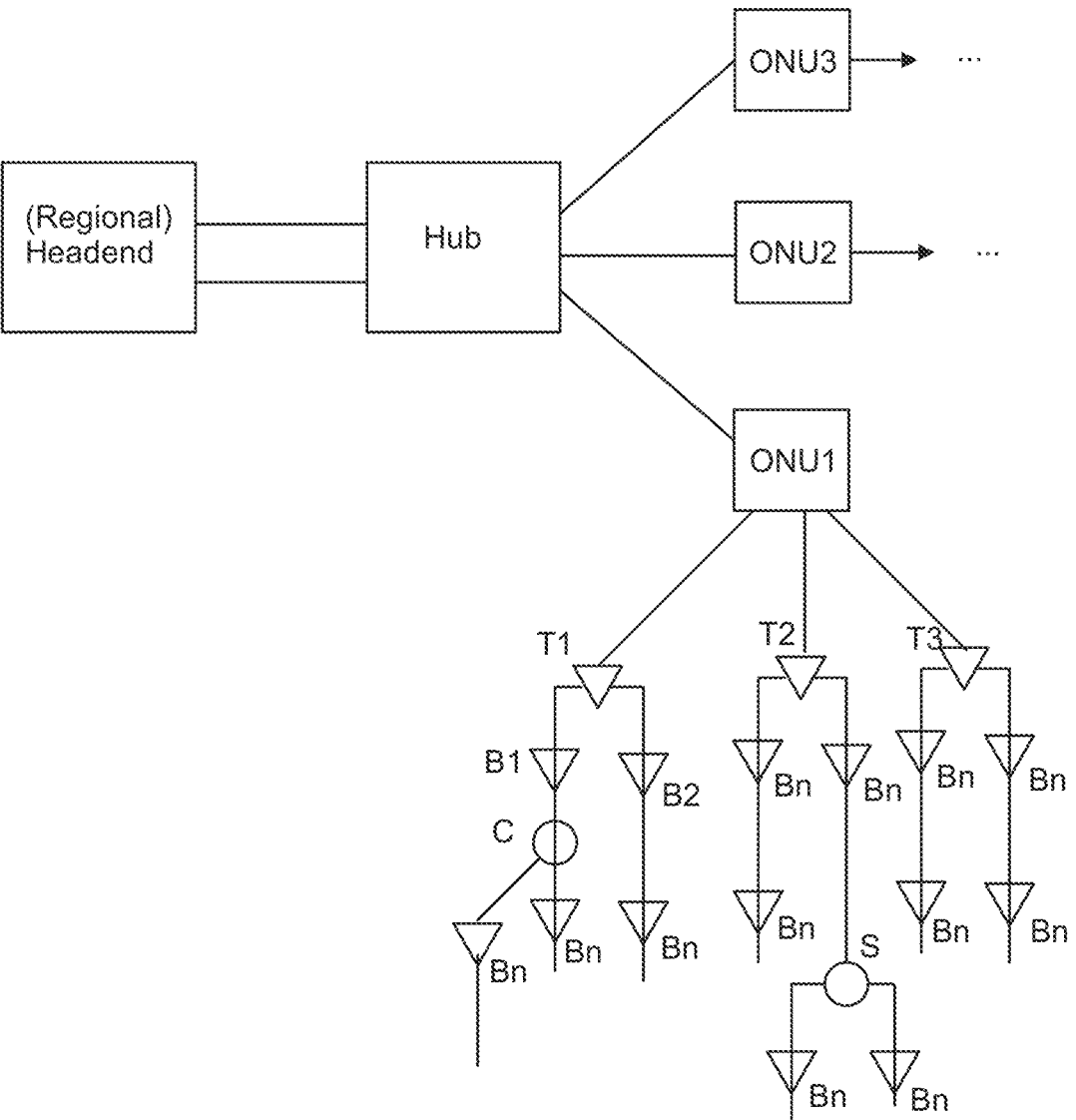
FIG. 1b shows an exemplified illustration of a topology of an HFC network.

FIG. 1*b* discloses an exemplified illustration of a topology of an HFC network. As mentioned above, in an HFC network, a main amplifier (a.k.a. headend or CCAP) or a regional headend of the network is connected via an optical fibre network, possibly via one or more distribution hubs, to one or more optical network units (ONU), which convert the optical signal to an electric signal to be relayed further in a coaxial cable network segment. The ONU may be an analogue node or an RPD/RMD node.

The example of FIG. 1*b* shows three ONUs (ONU1, ONU2, ONU3), and the coaxial cable network segment of ONU1 is depicted more in detail. The coaxial cable network segments underlying ONU2 and ONU3 have their own topology. An ONU may typically serve about 500-2000 customer subscriptions. The coaxial cable network segment may comprise one or more trunk RF amplifiers (T1, T2, T3) and a plurality of broadband line extender amplifiers (B1, B2, . . . , Bn) for amplifying the downstream and upstream transmissions in the network segment. Typically, there are roughly 15-30 broadband amplifiers in one or more coaxial cable network segments under one ONU. The connection(s) between the headend and the ONU(s) are implemented as star or point-to-point connections, whereas the broadband amplifiers are arranged in tree and branch configuration. The coaxial cable network segment may comprise splitters(S) and directional couplers (C) for dividing the network into further branches.

Typically in HFC networks, the broadband amplifiers of the network segment are configured to apply so-called unity gain principle. Therein, the broadband amplifiers are configured to align their gain and slope at the output such that the output signal has a fixed signal level and a flat frequency response. Thus, attenuations and changes in signal level caused in transmission between two broadband amplifiers are compensated in the latter broadband amplifier.

The CATV network operators benefit from knowing the exact topology of their networks. It makes localizing possible problems in networks easier. Thus, service interruptions may be kept shorter, whereupon the operators can save time and money.

Nevertheless, a practical problem today is that in most cases the documentation of network structure is not perfect. While various methods exist for determining the network topology, the operators tend to carry out the documentation still manually, whereupon it is prone to errors and easily outdated. The underlying reason for carrying out the documentation manually is that the existing methods have various problems: they are expensive, they cannot create 100% right and reliable result and/or they need new extra HW/SW to be added to field products.

Therefore, an improved arrangement is presented herein for determining a topology of a CATV network, especially the topology of a CATV network segment.

According to a first aspect, there is provided a method, as depicted in FIG. 2, for determining a topology of a cable television (CATV) network segment, wherein the network segment comprises a network node and a plurality of amplifiers in one or more branches of the network segment, the method comprising steps of:

a) providing (200) a first amplifier with instructions to adjust downstream signal level;

b) monitoring (202) changes of signal level or parameters of gain/slope alignment elements in one or more amplifiers in said network segment, said changes being caused as a compensation to the first amplifier adjusting its downstream signal level;

c) storing (204) information about each of said one or more amplifiers changing their signal level as a compensation to the first amplifier adjusting its downstream signal level, the information indicating each of said one or more amplifiers locating in downstream direction from the first amplifier;

repeating (206) steps a-c for all subsequent amplifiers in the network segment; and determining (208) the topology of the network segment based on the information of amplifiers locating in downstream direction in respect to each amplifier.

The method as described herein may be carried out by software, which may be executed by an apparatus. The apparatus may be a network element of the CATV network, such as the headend or an RPD/RMD node. Alternatively, the apparatus may be external to the actual CATV network, being for example a remote control node operated in a data processing device, such as a computer, laptop, tablet, smart phone or any similar device. The apparatus, as well as the software therein, is capable of bi-directional communication with each of amplifiers in the network segment. That is, the apparatus may at least transmit control signals to the amplifiers and receive status information of various parameters of the amplifiers, thereby enabling to monitor the current status of each of the amplifiers.

The software may also be implemented as a part of a larger software, for example, a management software of the CATV network. Thus, the execution of the software may also be distributed among a plurality of apparatus.

The amplifiers, as discussed herein, are preferably installed in coaxial cable network segment of a CAVT network. Thus, the amplifiers may be connected to each other with coaxial cables and/or passive components, such as splitter(s) or directional coupler(s).

It is noted that the term "first amplifier" as used herein does not necessarily refer to any specific order of the amplifiers in the network segment, but rather to any random (first) amplifier among all amplifiers. Thus, one of the plurality of amplifiers in the network segment is provided with instructions to adjust its downstream signal level. The adjustment of the signal level may be an increase or a decrease of the signal level. For the sake of example, it may be assumed that the signal level is slightly increased such that the service and data transmissions are not disturbed.

In response to the first amplifier adjusting its signal level, e.g. by a slight increase, the apparatus executing the software monitors the reactions of other amplifiers to the changed signal level of the first amplifier. If there are one or more amplifiers following the first amplifier next in downstream direction, i.e. in cascade in one or more branches, said one or more amplifiers will control their signal level or parameters of gain/slope alignment elements aiming to adjust their output signal levels back to normal level. On the other hand, any amplifiers before the first amplifier in the downstream direction are not affected by the changed signal level of the first amplifier, and thus they do not carry out any changes in their signal level or parameters of gain/slope alignment elements. Moreover, it is possible that said first amplifier is the only amplifier in its branch, and there are no further amplifiers following said first amplifier in downstream direction. In this case, no other amplifier in the network segment reacts to the changed signal level of the first amplifier. Based on the reactions of other amplifiers to the changed signal level of the first amplifier, it can be determined which one or more amplifiers locate directly next to the first amplifier in downstream direction. This information is stored for further processing.

The above steps are repeated for each amplifier, or at least until it can be determined for each amplifier, which other one or more amplifiers, if any, locate directly next to said amplifier in downstream direction. Based on this information regarding each amplifier, the topology of the network segment can then be determined.

It is noted that for implementing the method and the embodiments, there is no need to add any new hardware or software component to the amplifiers used on the field.

According to an embodiment, the method comprises, after step c, steps of:

d) providing the first amplifier with instructions to adjust the downstream signal level to opposite direction;

e) monitoring changes of signal level or parameters of gain/slope alignment elements in one or more amplifiers in said network segment, said changes being caused as a compensation to the first amplifier adjusting its downstream signal level to opposite direction;

f) storing information about each of said one or more amplifiers changing their signal level as a compensation to the first amplifier adjusting its downstream signal level to opposite direction;

repeating steps d-f for all subsequent amplifiers in the network segment; and confirming the topology of the network segment based on the information of amplifiers changing their signal level as a compensation to any amplifier adjusting its downstream signal level to opposite direction.

Thus, after controlling the first amplifier to adjusting its signal level, e.g. by a slight increase, and monitoring the reactions of other amplifiers to the changed signal level of the first amplifier, the apparatus executing the software may instruct the first amplifier to adjusting its signal level back to original level, e.g. by a corresponding slight decrease. The apparatus executing the software monitors the reactions of other amplifiers to the changed (returned) signal level of the first amplifier. Now the same one or more amplifiers (if any) that reacted for the first change of signal level should react to the second opposite change of the signal level. If affirmative, this information serves as a confirmation for the information obtained from the first adjustment of the signal level.

The above steps are repeated for each amplifier, or at least until it can be confirmed for each amplifier, if the same other one or more amplifiers, if any, react for the first change of signal level of the corresponding amplifier. Thus, the steps of adjusting the signal level, monitoring the changes in other amplifiers, adjusting the signal level back to the original value and monitoring the respective changes in other amplifiers may be carried out consecutively for each amplifier before carrying out the same steps for the next amplifier. Based on this information regarding each amplifier, the topology of the network segment can then be confirmed.

Figure 3:
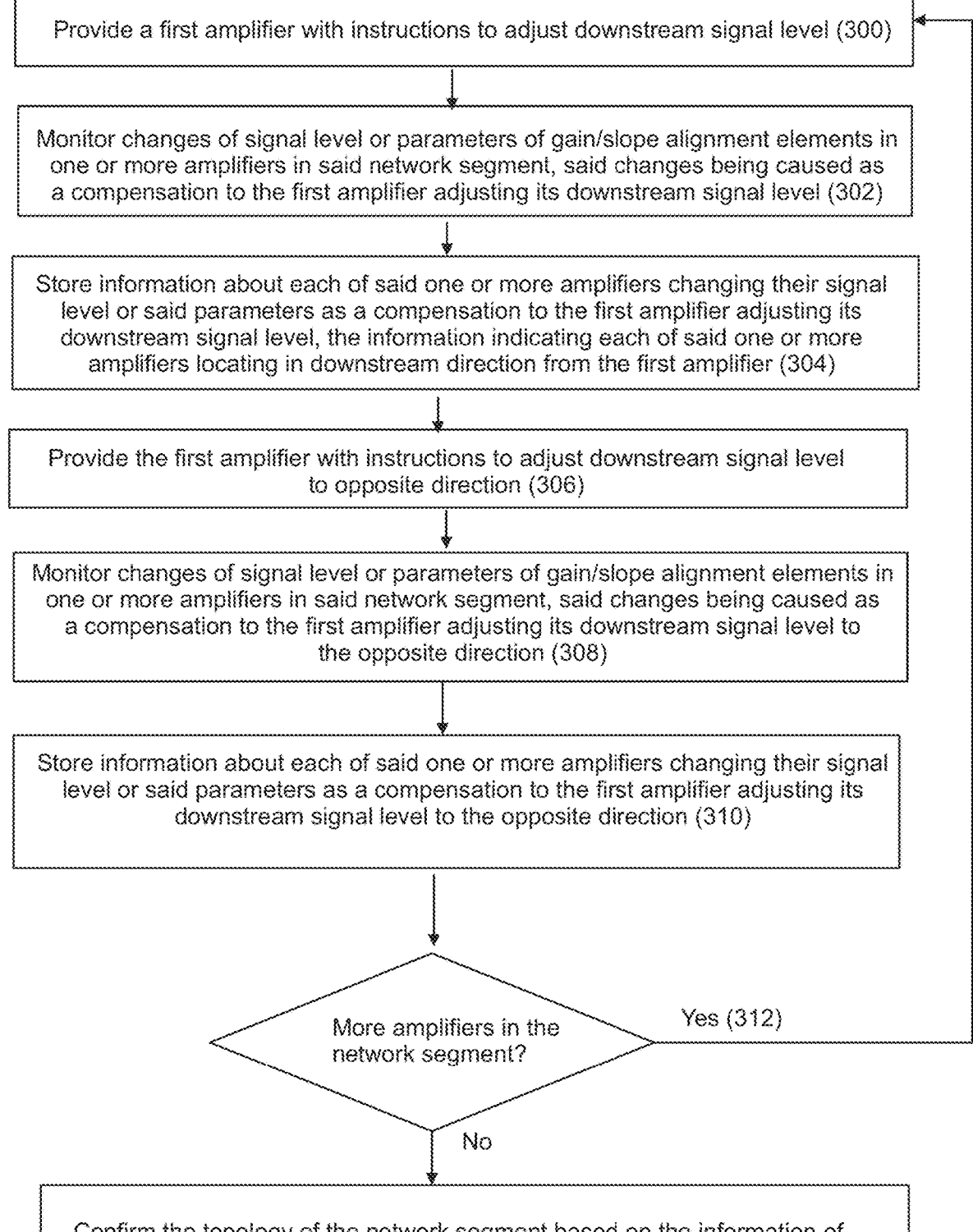
FIG. 3 shows a flow chart for determining the topology of a network segment according to an embodiment of the invention.

The above procedure is illustrated in the flow chart of FIG. 3, where the steps are carried out for each amplifier before carrying out the same steps for the next amplifier. Hence, a first amplifier in the network segment is provided with instructions to adjust its downstream signal level (300). In response to the first amplifier adjusting its signal level, the apparatus executing the software monitors (302) the reactions of other amplifiers to the changed signal level of the first amplifier for detecting any amplifier controlling their signal level or parameters of gain/slope alignment elements so as to adjust their output signal levels back to normal level. Based on the reactions of other amplifiers to the changed signal level of the first amplifier, it can be determined which one or more amplifiers locate directly next to the first amplifier in downstream direction. This information is stored (304) for further processing.

Now for the same first amplifier, instructions to adjust its downstream signal level to opposite direction, preferably to the original level, are provided (306). Again, the reactions of other amplifiers to the changed (returned) signal level of the first amplifier are monitored (308). The information about the one or more amplifiers that reacted to the changed (returned) signal level of the first amplifier is stored (310). There is a presumption that the same one or more amplifiers (if any) that reacted for the first change of signal level should react to the second opposite change of the signal level. If affirmative, this information serves as a confirmation for the information obtained from the first adjustment of the signal level for the first amplifier.

The above steps are repeated (312) for each amplifier, or at least until it can be determined for each amplifier, which other one or more amplifiers, if any, locate directly next to said amplifier in downstream direction. Based on this information regarding each amplifier, the topology of the network segment can then be confirmed (314).

According to an embodiment, said amplifiers are provided with a transponder for bi-directional communication between each amplifier and a remote control unit.

Herein, the remote control unit refers to the apparatus executing the software according to the embodiments. The amplifiers may comprise a transponder, for example a modem capable of two-way communication, so as to enable the remote control unit to provide the instructions for adjusting the signal level and to receive monitoring signaling from the amplifiers about the current (possibly changed) status of the amplifier. Such transponders may use different communication protocols like HMS (Hybrid Management Sub-Layer), DOCSIS, Lora or vendor's proprietary method.

According to an embodiment, said gain/slope alignment elements of the amplifiers comprise at least one of an automatic level and slope control (ALSC) unit or an automatic gain control (AGC) unit, wherein said changes performed as a compensation to another amplifier adjusting its downstream signal level are carried out automatically by the ALSC unit or the AGC unit.

A network element of a CATV network, such as a broadband amplifier, typically comprises either an automatic gain control (AGC) unit or an automatic level and slope control (ALSC) unit. These units may be referred to as the gain/slope alignment elements. Such units typically enable to automatically adjust the gain and the slope of downstream signal path such that the signal levels of primary pilot signals match the target values. Thus, the ALSC and/or AGC units apply the unity gain principle, whereupon if the signal level of the previous amplifier of the network segment in downstream direction has increased (or decreased) its output signal level, thus affecting to input signal level of the current amplifier, the current amplifier (or more precisely the ALSC and/or AGC units therein) automatically adjusts its signal level aiming to compensate for the increase (or the decrease) in its input signal level to revert the output signal level back to the original.

According to an embodiment, the downstream signal level is adjusted by a value larger than deadband of the ALSC unit or the AGC unit, such as +1-+2 dB.

Hence, the signal level adjustment may advantageously be carried out in small steps so as not to disturb the service and data transmission. The signal level is preferably not adjusted too much to avoid the broadband amplifiers to overload. On the other hand, too low levels are preferably not used either to avoid problems caused by Carrier-to-Noise ratio (CNR), wherein a too minor signal level adjustment might not be detected. However, it is preferable to apply the signal level change as larger than the used deadband of ALSC system. For example, upon increasing the signal level, the change may be +1 . . . +2 dB, and upon decreasing the signal level, a corresponding change may be made in opposite direction.

According to an embodiment, the method comprises adjusting the slope of the downstream signal more predominantly at a low frequency part of a downstream signal band than at a high frequency part of a downstream signal band.

Thus, the slope level adjustment may be utilised in limiting the signal level adjustments mainly to the lower frequencies of the downstream signal band. The slope control may advantageously be carried out more predominantly for the lower frequencies of the downstream signal band. Carrying out the slope level adjustment mostly at lower frequencies is beneficial, since such level changes have no practical impact to amplifiers total RF power, whereupon practically the original loading may be used.

According to an embodiment, the network segment comprises one or more cable modems connected to each of the plurality of amplifiers, the method comprising steps of:

g) providing a first amplifier with instructions to adjust upstream signal level;

h) monitoring changes of upstream signal level in one or more cable modems in said network segment, said changes being caused as a compensation to the first amplifier adjusting its upstream signal level;

i) storing information about each of said one or more cable modems changing their upstream signal level as a compensation to the first amplifier adjusting its upstream signal level, the information indicating each of said one or more cable modems locating in downstream direction from the first amplifier;

repeating steps g-i for all subsequent amplifiers in the network segment; and determining the topology of the network segment based on the information of cable modems locating in downstream direction in respect to each amplifier.

Thus, in an embodiment, which could be implemented as a combination with any of the other embodiments, or alternatively, as an independent aspect of the invention, the topology of the network segment may be further confirmed or even independently determined based on similar kind of upstream signal level adjustments of the amplifiers and monitoring the changes in upstream signal levels of the cable modems connected to the network segment.

As described above, there are a plurality of cable modems connected to the network segment. Now, one of the plurality of amplifiers in the network segment is provided with instructions to adjust its upstream signal level. The adjustment of the signal level may be an increase or a decrease of the signal level. Again, for the sake of example, it may be assumed that the signal level is slightly increased such that the service and data transmissions are not disturbed.

In response to the first amplifier adjusting its signal level, e.g. by a slight increase, the apparatus executing the software monitors the reactions of the cable modems to the changed signal level of the first amplifier. If there are one or more cable modems connected to the first amplifier, said one or more cable modems will control their upstream signal levels to reflect the changed upstream signal level of the first amplifier. On the other hand, any cable modems not connected to the first amplifier are not affected by the changed signal level of the first amplifier, and thus they do not carry out any changes in their upstream signal level. Based on the reactions of cable modems to the changed signal level of the first amplifier, it can be determined which one or more cable modems are connected to the first amplifier in downstream direction. This information is stored for further processing.

The above steps are repeated for each amplifier, or at least until it can be determined for each amplifier, which cable modems, if any, are connected to said amplifier in downstream direction. Based on this information regarding each amplifier, the topology of the network segment can then be further confirmed or even independently determined.

It is noted that for the above embodiments, it is not required for the software or the apparatus executing the software to communicate with the DOCSIS system as such, but the determination of the network topology may be performed independently. It is nevertheless noted that regarding the embodiments involving the cable modems, the DOCSIS system provides identification data for the cable modems, wherein collaboration with this data may enhance the implementation of determining the topology.

According to an embodiment, the method comprises, after step i, steps of:

j) providing the first amplifier with instructions to adjust the upstream signal level to opposite direction;

k) monitoring changes of upstream signal level in one or more cable modems in said network segment, said changes being caused as a compensation to the first amplifier adjusting its upstream signal level to opposite direction;

l) storing information about each of said one or more cable modems changing their upstream signal level as a compensation to the first amplifier adjusting its upstream signal level to opposite direction;

repeating steps j-l for all subsequent amplifiers in the network segment; and confirming the topology of the network segment based on the information of cable modems changing their upstream signal level as a compensation to any amplifier adjusting its upstream signal level to opposite direction.

Thus, after controlling the first amplifier to adjusting its upstream signal level, e.g. by a slight increase, and monitoring the reactions of cable modems to the changed signal level of the first amplifier, the apparatus executing the software may instruct the first amplifier to adjust its upstream signal level back to original level, e.g. by a corresponding slight decrease. The apparatus executing the software monitors the reactions of cable modems to the changed (returned) signal level of the first amplifier. Now the same one or more cable modems (if any) that reacted for the first change of signal level should react to the second opposite change of the signal level. If affirmative, this information serves as a confirmation for the information obtained from the first adjustment of the signal level.

The above steps are repeated for each amplifier, or at least until it can be confirmed for each amplifier, if the same cable modems, if any, react for the first change of signal level of the corresponding amplifier. Based on this information regarding each amplifier, the topology of the network segment can then be confirmed.

An apparatus according to an aspect comprises at least one processor and at least one memory, said at least one memory stored with computer program code thereon, the at least one memory and the computer program code configured to, with the at least one processor, cause the apparatus at least to perform:

a) provide, in a cable television (CATV) network segment comprising a network node and a plurality of amplifiers in one or more branches of the network segment a first amplifier with instructions to adjust downstream signal level;

b) monitor changes of signal level or parameters of gain/slope alignment elements in one or more amplifiers in said network segment, said changes being caused as a compensation to the first amplifier adjusting its downstream signal level;

c) store information about each of said one or more amplifiers changing their signal level or said parameters as a compensation to the first amplifier adjusting its downstream signal level, the information indicating each of said one or more amplifiers locating in downstream direction from the first amplifier;

repeat steps a-c for all subsequent amplifiers in the network segment; and determine a topology of the network segment based on the information of amplifiers locating in downstream direction in respect to each amplifier.

According to an embodiment, the apparatus comprises computer program code configured to, with the at least one processor, cause the apparatus to d) provide the first amplifier with instructions to adjust the downstream signal level to opposite direction;

e) monitor changes of signal level or parameters of gain/slope alignment elements in one or more amplifiers in said network segment, said changes being caused as a compensation to the first amplifier adjusting its downstream signal level to opposite direction;

f) store information about each of said one or more amplifiers changing their signal level or said parameters as a compensation to the first amplifier adjusting its downstream signal level to the opposite direction;

repeat steps d-f for all subsequent amplifiers in the network segment; and confirm the topology of the network segment based on the information of amplifiers changing their signal level as a compensation to any amplifier adjusting its downstream signal level to opposite direction.

According to an embodiment, said amplifiers are provided with a transponder for bi-directional communication between each amplifier and a remote control unit.

According to an embodiment, said gain/slope alignment elements of the amplifiers comprise at least one of an automatic level and slope control (ALSC) unit or an automatic gain control (AGC) unit, wherein said changes performed as a compensation to another amplifier adjusting its downstream signal level are carried out automatically by the ALSC unit or the AGC unit.

According to an embodiment, the downstream signal level is adjusted by a value larger than deadband of the ALSC unit or the AGC unit, such as +1-+2 dB.

According to an embodiment, the apparatus comprises computer program code configured to, with the at least one processor, cause the apparatus to adjust the slope of the downstream signal more predominantly at a low frequency part of a downstream signal band than at a high frequency part of a downstream signal band.

According to an embodiment, the network segment comprises one or more cable modems connected to each of the plurality of amplifiers, the apparatus comprising computer program code configured to, with the at least one processor, cause the apparatus to g) provide a first amplifier with instructions to adjust upstream signal level;

h) monitor changes of upstream signal level in one or more cable modems in said network segment, said changes being caused as a compensation to the first amplifier adjusting its upstream signal level;

i) store information about each of said one or more cable modems changing their upstream signal level as a compensation to the first amplifier adjusting its upstream signal level, the information indicating each of said one or more cable modems locating in downstream direction from the first amplifier;

repeat steps g-i for all subsequent amplifiers in the network segment; and determine the topology of the network segment based on the information of cable modems locating in downstream direction in respect to each amplifier.

According to an embodiment, the apparatus comprises computer program code configured to, with the at least one processor, cause the apparatus to j) provide the first amplifier with instructions to adjust the upstream signal level to opposite direction;

k) monitor changes of upstream signal level in one or more cable modems in said network segment, said changes being caused as a compensation to the first amplifier adjusting its upstream signal level to opposite direction;

l) store information about each of said one or more cable modems changing their upstream signal level as a compensation to the first amplifier adjusting its upstream signal level to opposite direction;

repeat steps j-l for all subsequent amplifiers in the network segment; and confirm the topology of the network segment based on the information of cable modems changing their upstream signal level as a compensation to any amplifier adjusting its upstream signal level to opposite direction.

Further aspects relate to computer program products, stored on a non-transitory memory medium, comprising computer program code, which when executed by at least one processor, causes an apparatus at least to perform at least to perform the steps of the method and its embodiments.

Figure 4:
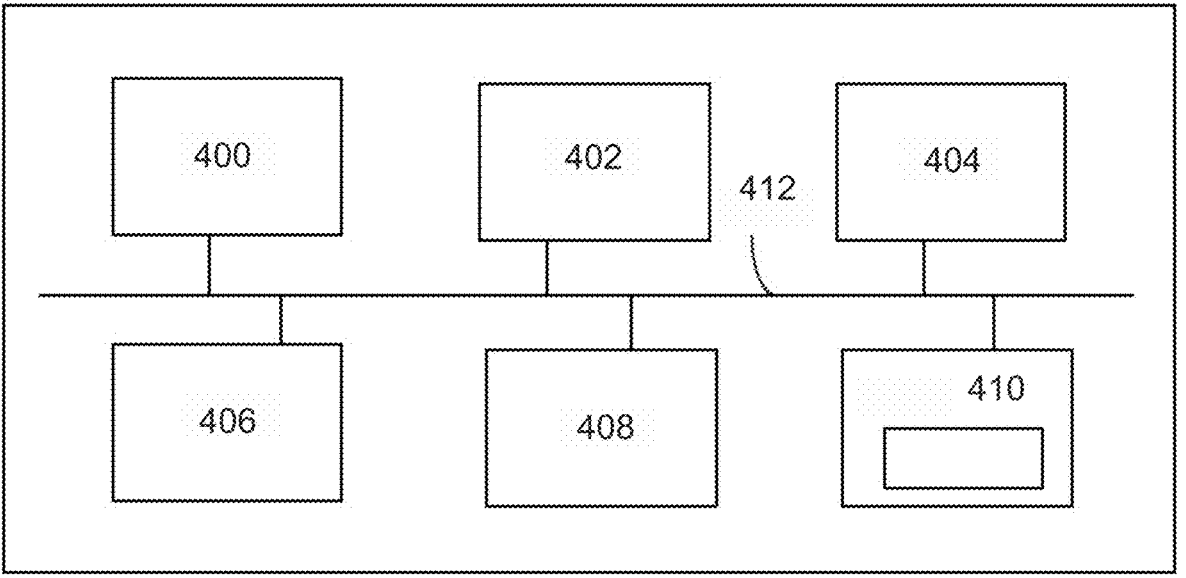
FIG. 4 shows a simplified block chart of an apparatus according to an embodiment of the invention.

Such apparatuses may comprise e.g. apparatuses and/or the functional units disclosed in Figures for implementing the embodiments. FIG. 4 illustrates an apparatus according to an embodiment. The generalized structure of the apparatus will be explained in accordance with the functional blocks of the system. Several functionalities can be carried out with a single physical device, e.g. all calculation procedures can be performed in a single processor, if desired. A data processing system of an apparatus according to an example of FIG. 4 comprises a main processing unit 400, a memory 402, a storage device 404, an input device 406, an output device 408, and a graphics subsystem 410, which are all connected to each other via a data bus 412. A client may be understood as a client device or a software client running on an apparatus.

The main processing unit 400 is a processing unit arranged to process data within the data processing system.

The main processing unit 400 may comprise or be implemented as one or more processors or processor circuitry. The memory 402, the storage device 404, the input device 406, and the output device 408 may include other components as recognized by those skilled in the art. The memory 402 and storage device 404 store data in the data processing system 400. Computer program code resides in the memory 402 for implementing, for example, the topology determination process. The input device 406 inputs data into the system while the output device 408 receives data from the data processing system and forwards the data, for example to a display. While the data bus 412 is shown as a single line, it may be any combination of the following: a processor bus, a PCI bus, a graphical bus, an ISA bus. Accordingly, a skilled person readily recognizes that the apparatus may be any data processing device, such as a computer device, a personal computer, or a server computer.

In general, the various embodiments may be implemented in hardware or special purpose circuits or any combination thereof. While various embodiments may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

A skilled person appreciates that any of the embodiments described above may be implemented as a combination with one or more of the other embodiments, unless there is explicitly or implicitly stated that certain embodiments are only alternatives to each other.

The various embodiments can be implemented with the help of computer program code that resides in a memory and causes the relevant apparatuses to carry out the invention. Thus, the implementation may include a computer readable storage medium stored with code thereon for use by an apparatus, such as the network element, which when executed by a processor, causes the apparatus to perform the various embodiments or a subset of them. In addition, or alternatively, the implementation may include a computer program embodied on a non-transitory computer readable medium, the computer program comprising instructions causing, when executed on at least one processor, at least one apparatus to perform the various embodiments or a subset of them. For example, an apparatus may comprise circuitry and electronics for handling, receiving and transmitting data, computer program code in a memory, and a processor that, when running the computer program code, causes the apparatus to carry out the features of an embodiment.

It will be obvious for a person skilled in the art that with technological developments, the basic idea of the invention can be implemented in a variety of ways. Thus, the invention and its embodiments are not limited to the above-described examples, but they may vary within the scope of the claims.

The invention claimed is:

1. A method for determining a topology of a cable television (CATV) network segment, wherein the network segment comprises a network node and a plurality of broadband amplifiers in one or more branches of the network segment arranged in a tree or branch configuration, the method comprising steps of
    a) providing a first broadband amplifier with instructions to adjust downstream signal level;
    b) monitoring changes of signal level or parameters of gain/slope alignment elements in one or more broadband amplifiers in said network segment, said changes being caused as a compensation to the first broadband amplifier adjusting its downstream signal level;
    c) storing information about each of said one or more broadband amplifiers changing their signal level or said parameters as a compensation to the first broadband amplifier adjusting its downstream signal level, the information indicating each of said one or more broadband amplifiers locating in downstream direction from the first broadband amplifier;
    repeating steps a-c for all subsequent broadband amplifiers in the network segment; and
    determining the topology of the broadband amplifiers of the network segment based on the information of broadband amplifiers locating in downstream direction in respect to each broadband amplifier, said information being obtained based on the changes of the signal level or the parameters as a compensation to one broadband amplifier adjusting its downstream signal level.

2. The method according claim 1, comprising, after step c, steps of
    d) providing the first broadband amplifier with instructions to adjust the downstream signal level to opposite direction;
    e) monitoring changes of signal level or parameters of gain/slope alignment elements in one or more broadband amplifiers in said network segment, said changes being caused as a compensation to the first broadband amplifier adjusting its downstream signal level to the opposite direction;
    f) storing information about each of said one or more broadband amplifiers changing their signal level or said parameters as a compensation to the first broadband amplifier adjusting its downstream signal level to the opposite direction;
    repeating steps d-f for all subsequent broadband amplifiers in the network segment; and
    confirming the topology of the broadband amplifiers of the network segment based on the information of broadband amplifiers changing their signal level as a compensation to any broadband amplifier adjusting its downstream signal level to opposite direction.

3. The method according to claim 1, wherein said broadband amplifiers are provided with a transponder for bi-directional communication between each broadband amplifier and a remote control unit.

4. The method according to claim 1, wherein said gain/slope alignment elements of the broadband amplifiers comprise at least one of an automatic level and slope control (ALSC) unit or an automatic gain control (AGC) unit, wherein said changes performed as a compensation to another broadband amplifier adjusting its downstream signal level are carried out automatically by the ALSC unit or the AGC unit.

5. The method according to claim 4, wherein the downstream signal level is adjusted by a value larger than deadband of the ALSC unit or the AGC unit.

6. The method according to claim 4, comprising
    adjusting the slope of the downstream signal more predominantly at a low frequency part of a downstream signal band than at a high frequency part of a downstream signal band.

7. The method according to claim 1, wherein the network segment comprises one or more cable modems connected to each of the plurality of broadband amplifiers, the method comprising steps of g) providing a first broadband amplifier with instructions to adjust upstream signal level;

h) monitoring changes of upstream signal level in one or more cable modems in said network segment, said changes being caused as a compensation to the first broadband amplifier adjusting its upstream signal level;

i) storing information about each of said one or more cable modems changing their upstream signal level as a compensation to the first broadband amplifier adjusting its upstream signal level, the information indicating each of said one or more cable modems locating in downstream direction from the first broadband amplifier;

repeating steps g-i for all subsequent broadband amplifiers in the network segment; and determining the topology of the broadband amplifiers of the network segment based on the information of cable modems locating in downstream direction in respect to each broadband amplifier.

8. The method according claim 7, comprising, after step i, steps of j) providing the first broadband amplifier with instructions to adjust the upstream signal level to opposite direction;

k) monitoring changes of upstream signal level in one or more cable modems in said network segment, said changes being caused as a compensation to the first broadband amplifier adjusting its upstream signal level to opposite direction;

l) storing information about each of said one or more cable modems changing their upstream signal level as a compensation to the first broadband amplifier adjusting its upstream signal level to opposite direction;

repeating steps j-l for all subsequent broadband amplifiers in the network segment; and confirming the topology of the broadband amplifies of the network segment based on the information of cable modems changing their upstream signal level as a compensation to any broadband amplifier adjusting its upstream signal level to opposite direction.

9. A computer program product, embodied on a non-transitory computer readable medium, the computer program product comprising instructions causing, when executed on at least one processor, at least one apparatus to perform the method according to claim 1.

10. An apparatus comprising at least one processor and at least one memory, said at least one memory stored with computer program code thereon, the at least one memory and the computer program code configured to, with the at least one processor, cause the apparatus at least to perform:

a) provide, in a cable television (CATV) network segment comprising a network node and a plurality of broadband amplifiers in one or more branches of the network segment arranged in tree or branch configuration, a first broadband amplifier with instructions to adjust downstream signal level;

b) monitor changes of signal level or parameters of gain/slope alignment elements in one or more broadband amplifiers in said network segment, said changes being caused as a compensation to the first broadband amplifier adjusting its downstream signal level;

c) store information about each of said one or more broadband amplifiers changing their signal level or said parameters as a compensation to the first broadband amplifier adjusting its downstream signal level, the information indicating each of said one or more broadband amplifiers locating in downstream direction from the first broadband amplifier;

repeat steps a-c for all subsequent broadband amplifiers in the network segment; and determine a topology of the broadband amplifiers of the network segment based on the information of broadband amplifiers locating in downstream direction in respect to each broadband amplifier, said information being obtained based on the changes of the signal level or the parameters as a compensation to one broadband amplifier adjusting its downstream signal level.

11. The apparatus according claim 10, comprising computer program code configured to, with the at least one processor, cause the apparatus to d) provide the first broadband amplifier with instructions to adjust the downstream signal level to opposite direction;

e) monitor changes of signal level or parameters of gain/slope alignment elements in one or more broadband amplifiers in said network segment, said changes being caused as a compensation to the first broadband amplifier adjusting its downstream signal level to opposite direction;

f) store information about each of said one or more broadband amplifiers changing their signal level or said parameters as a compensation to the first broadband amplifier adjusting its downstream signal level to the opposite direction;

repeat steps d-f for all subsequent broadband amplifiers in the network segment; and confirm the topology of the broadband amplifiers of the network segment based on the information of broadband amplifiers changing their signal level as a compensation to any broadband amplifier adjusting its downstream signal level to opposite direction.

12. The apparatus according to claim 10, wherein said broadband amplifiers are provided with a transponder for bi-directional communication between each broadband amplifier and a remote control unit.

13. The apparatus according to claim 10, wherein said gain/slope alignment elements of the broadband amplifiers comprise at least one of an automatic level and slope control (ALSC) unit or an automatic gain control (AGC) unit, wherein said changes performed as a compensation to another broadband amplifier adjusting its downstream signal level are carried out automatically by the ALSC unit or the AGC unit.

14. The apparatus according to claim 13, wherein the downstream signal level is adjusted by a value larger than deadband of the ALSC unit or the AGC.

15. The apparatus according to claim 13, comprising computer program code configured to, with the at least one processor, cause the apparatus to adjust the slope of the downstream signal more predominantly at a low frequency part of a downstream signal band than at a high frequency part of a downstream signal band.

16. The apparatus according to claim 10, wherein the network segment comprises one or more cable modems connected to each of the plurality of amplifiers, the apparatus comprising computer program code configured to, with the at least one processor, cause the apparatus to g) provide a first broadband amplifier with instructions to adjust upstream signal level;

h) monitor changes of upstream signal level in one or more cable modems in said network segment, said changes being caused as a compensation to the first broadband amplifier adjusting its upstream signal level;

i) store information about each of said one or more cable modems changing their upstream signal level as a compensation to the first broadband amplifier adjusting its upstream signal level, the information indicating each of said one or more cable modems locating in downstream direction from the first broadband amplifier;

repeat steps g-i for all subsequent broadband amplifiers in the network segment; and determine the topology of the broadband amplifiers of the network segment based on the information of cable modems locating in downstream direction in respect to each broadband amplifier.

17. The apparatus according claim 16, comprising computer program code configured to, with the at least one processor, cause the apparatus to j) provide the first broadband amplifier with instructions to adjust the upstream signal level to opposite direction;

k) monitor changes of upstream signal level in one or more cable modems in said network segment, said changes being caused as a compensation to the first broadband amplifier adjusting its upstream signal level to opposite direction;

l) store information about each of said one or more cable modems changing their upstream signal level as a compensation to the first broadband amplifier adjusting its upstream signal level to opposite direction;

repeat steps j-l for all subsequent broadband amplifiers in the network segment; and confirm the topology of the broadband amplifiers of the network segment based on the information of cable modems changing their upstream signal level as a compensation to any broadband amplifier adjusting its upstream signal level to opposite direction.

* * * * *